United States Patent [19]

Anderson et al.

[11] Patent Number: 5,740,083
[45] Date of Patent: Apr. 14, 1998

[54] DELTA TIME MEASUREMENT CIRCUIT FOR DETERMINING PARAMETER DERIVATIVES OF A ROTATIONAL VELOCITY SENSOR SIGNAL

[75] Inventors: Robert Lee Anderson, Saline, Mich.; Marcella Evelyn Meyer, Austin; Gary Lynn Miller, Round Rock, both of Tex.

[73] Assignees: Ford Motor Company, Dearborn, Mich.; Motorola, Inc., Schaumburg, Ill.

[21] Appl. No.: 625,152

[22] Filed: Apr. 1, 1996

[51] Int. Cl.⁶ .................................................. G01P 3/427
[52] U.S. Cl. .................... 364/565; 364/424.1; 324/166; 377/20
[58] Field of Search ........................ 364/565, 426.1; 324/166, 160, 173; 377/19, 20; 74/866, 867

[56] References Cited

U.S. PATENT DOCUMENTS

| | | | |
|---|---|---|---|
| 3,757,167 | 9/1973 | Yoshikawa et al. | 317/5 |
| 4,056,778 | 11/1977 | Randazzo | 324/166 |
| 4,257,005 | 3/1981 | Hall . | |
| 4,434,470 | 2/1984 | Thomas et al. | 364/565 |
| 4,485,452 | 11/1984 | Cording et al. | 364/565 |
| 4,624,005 | 11/1986 | Tachino | 377/20 |
| 4,672,556 | 6/1987 | Shepler | 364/484 |
| 4,763,261 | 8/1988 | Imanaka et al. | 364/426 |
| 4,794,551 | 12/1988 | Yoshida | 364/565 |
| 4,985,859 | 1/1991 | Rauner et al. | 364/565 |
| 5,029,087 | 7/1991 | Cowan et al. | 364/424.1 |
| 5,062,064 | 10/1991 | Sagues et al. | 364/565 |
| 5,081,886 | 1/1992 | Person et al. | 74/866 |
| 5,146,162 | 9/1992 | Kamiyama et al. | 324/166 |
| 5,150,297 | 9/1992 | Daubenmier et al. | 364/424.1 |
| 5,157,608 | 10/1992 | Sankpal et al. | 364/424.1 |
| 5,168,220 | 12/1992 | Min | 324/166 |
| 5,179,875 | 1/1993 | Brown | 74/866 |
| 5,222,022 | 6/1993 | Adams et al. | 364/431.07 |
| 5,222,024 | 6/1993 | Orita et al. | 364/468 |

*Primary Examiner*—James P. Trammell
*Assistant Examiner*—Kamini S. Shah
*Attorney, Agent, or Firm*—Peter Abolins; Roger L. May

[57] ABSTRACT

An electronic circuit having control data registers (24–28) for receiving the output of a digital counter (20) that records clock pulses within a measured time that is determined by a rotary speed sensor (14) which produces a square wave pulse train signal and separate registers (30,32) for recording the time of each signal developed by the speed sensor and the time to produce a pulse train signal of predetermined length whereby the data in the data registers may be used to determine velocity and derivatives of that velocity for use in solving dynamic equations stored in memory thus effecting control system output functions.

3 Claims, 4 Drawing Sheets

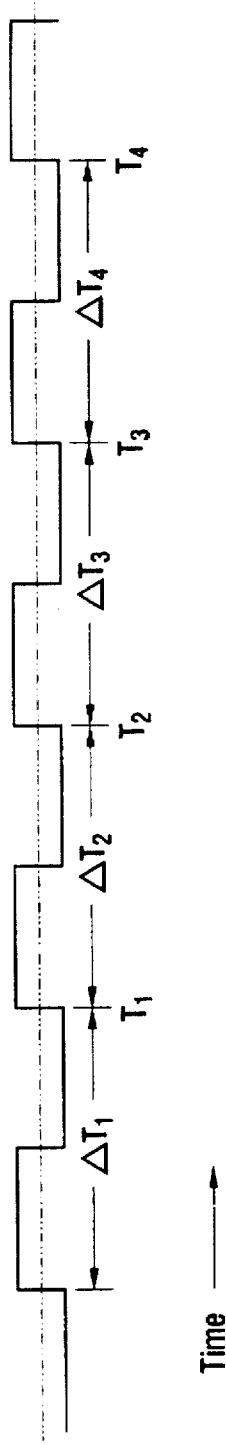
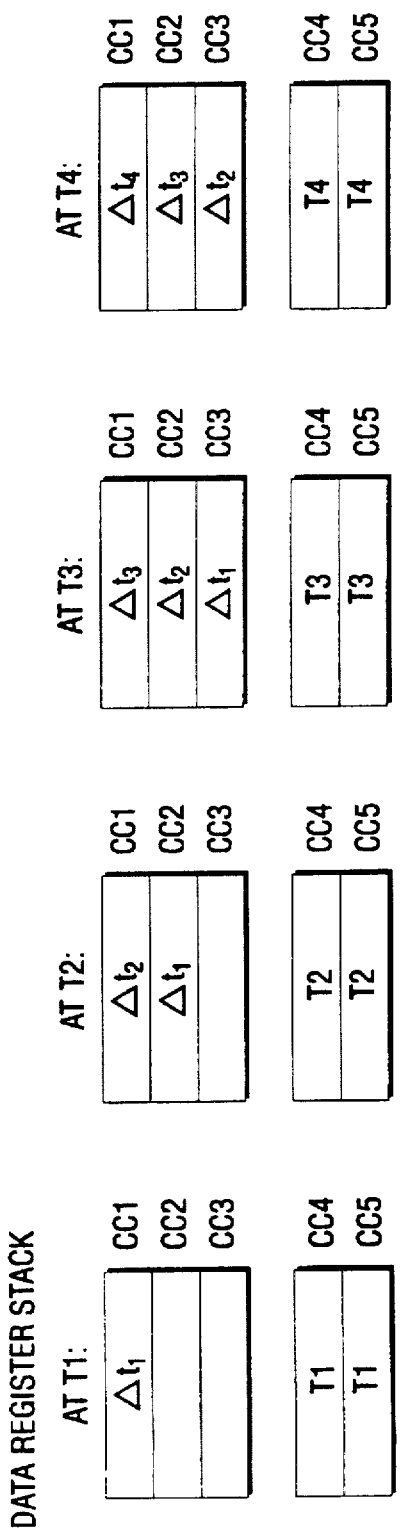

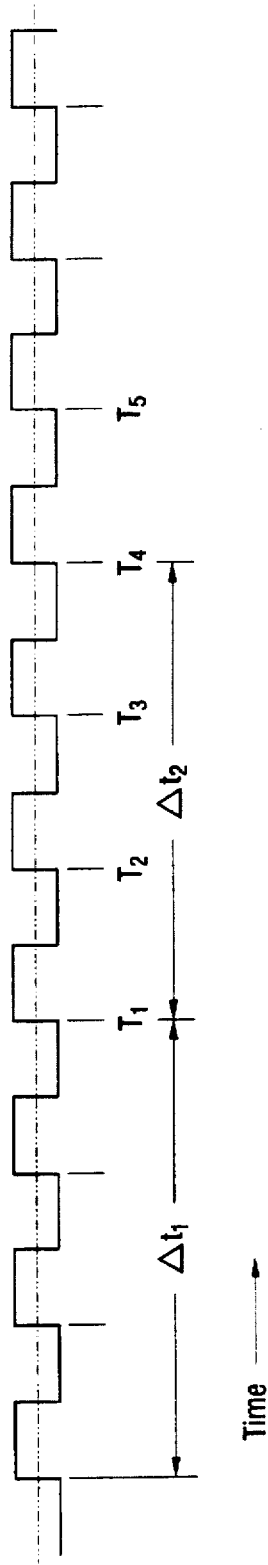

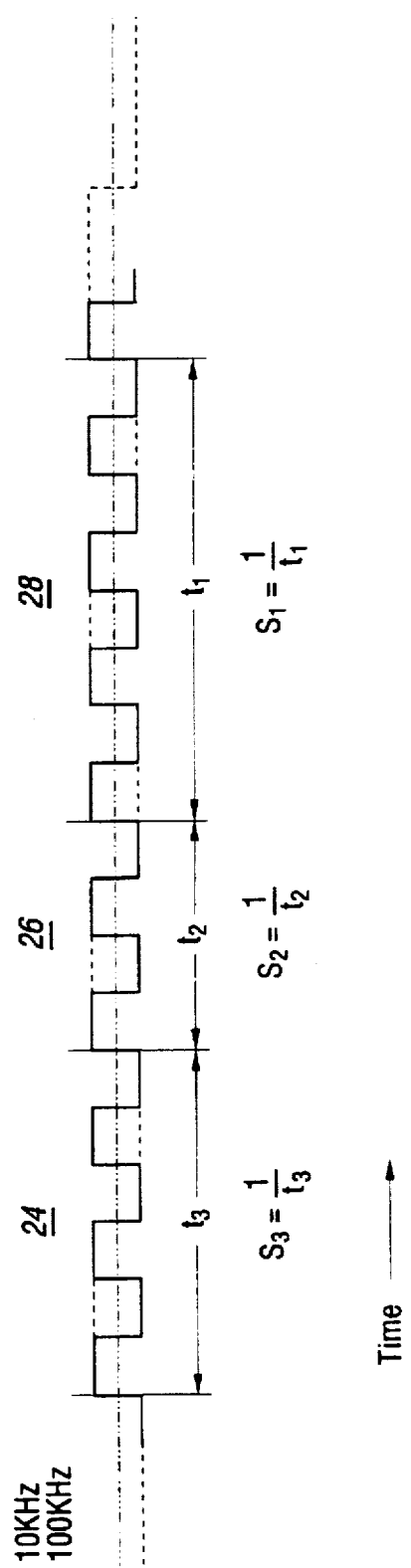

5,740,083

1

DELTA TIME MEASUREMENT CIRCUIT FOR DETERMINING PARAMETER DERIVATIVES OF A ROTATIONAL VELOCITY SENSOR SIGNAL

TECHNICAL FIELD

The invention is adapted for use in electronic control systems having a microprocessor with a CPU that solves dynamic equations using rotational velocity information.

BACKGROUND OF THE INVENTION

In a control system that uses rotational velocity as a sensor input, it often is necessary to use the first derivative of the velocity value. Usually higher derivatives of that value are used as well. Such control systems usually include a microprocessor having a CPU that receives the sensed velocity value and performs computations to develop the first and higher derivatives before it stores that data in a RAM portion of the microprocessor memory. The stored data is fetched as its memory register is addressed by a program counter and is transferred to computation registers where it is used to solve equations that are also fetched by the program counter from ROM portions of the memory.

The requirement to pre-process the velocity data before it can be used in the computations that involve the information stored in ROM requires added processing time and an increased number of registers. This reduces the capacity of the processor to store data and to process instructions within an acceptable time. This requirement to pre-process velocity data imposes a burden on the microprocessor that affects, for example, its ability to control functions in complex applications such as an automotive vehicle powertrain in which a single processor is used for a variety of purposes, including engine ignition timing control, engine fuel injection timing and exhaust gas recirculation control as well as automatic transmission control functions such as transmission pressure control during shifts and speed ratio changes under varying operating conditions. The capacity of the microprocessor is a significant limiting factor in the design of a control system of this type.

A typical example of a control system that employs a speed sensor for producing an input speed signal as one of several variables is found in U.S. Pat. No. 5,179,875, which discloses a turbine speed controller for an automatic transmission. The controller establishes controlled engagement of a torque converter clutch whereby the clutch pressure is regulated in a closed-loop manner as the controller responds to the turbine speed signal to effect a pressure buildup in the clutch so that the rate of engagement of the clutch corresponds to a calibrated clutch engagement rate. The pressure is controlled by a pulse-width modulated solenoid valve. Provision is made for sensing the clutch pressure delivered to a pressure transducer, the output of which is distributed to a summing point where the value for the present duty cycle for the solenoid valve is obtained by adding an appropriate output gain adjustment. That gain adjustment is added to the total duty cycle that existed in the preceding background loop of the microprocessor.

Phase compensation is achieved by using a proportional gain factor, an integral gain factor, and a derivative gain factor. The derivative gain factor and the integral gain factor are functions of the turbine speed error. This requires the processor CPU to obtain derivative values of the speed error by making computations that, of necessity, precede the calculation of the appropriate gain adjustment.

Another example of a controller that requires preprocessing of a speed signal is described in U.S. Pat. No. 5,029,087,

2 which discloses a clutch engagement strategy. A torque converter slip error is calculated by the controller in the system of the '087 patent as a PID control circuit produces a so-called gain factor. Although the controller uses a proportional control for establishing a gain factor, the range of the gain factor is limited since it is incapable of producing a desired response due to steady-state errors or undesired slip oscillations of the clutch. Because of this limitation, an integral control component of the PID control circuit eliminates steady-state error and improves system accuracy. A stabilizing effect is achieved by adding a phase lead to the control loop by introducing a derivative control. Both the derivative control component and the integral control component of the gain compensation require the processor to undergo preliminary computations involving speed measurements.

In the control system of U.S. Pat. No. 5,157,608, it is required that the turbine speed be measured and that a turbine speed derivative be obtained in order to define a trigger point at which an engine torque modification is effected by retarding spark timing. The turbine speed derivative is a more useful signal for triggering the retardation of the engine spark than a simpler measurement of a change in turbine speed; but again, its use requires the processor to pre-process the turbine speed information obtained from the speed sensor. This, as mentioned above, is an added burden on the processor.

The control system of U.S. Pat. No. 5,157,608 also makes provision for avoiding harshness in a downshift that requires the operation of a friction clutch and a friction brake in synchronism. If a vehicle is being braked hard at the time a downshift occurs, it is necessary to decelerate the engine and the rotating elements in the driveline to achieve synchronism at a rate that is faster than the rate that would exist for soft vehicle deceleration. If the vehicle is decelerated at a high rate, the friction brake must be applied more quickly in order to avoid harshness in the shift. This feature is achieved by using deceleration as one of the input variables for the processor. This also imposes an added burden on the processor because of the additional pre-processing of the input signal that must be achieved before a useful output duty cycle can be developed for the pulse width modulated control valve that controls the downshift pressures.

BRIEF DESCRIPTION OF THE INVENTION

Our invention comprises a circuit and a method for determining parameter derivatives for use in solving dynamic equations stored in ROM portions of the microprocessor memory, particularly a parameter that depends upon rotational velocity of a rotary member. It is possible with our invention to measure velocity, acceleration and rate of change of acceleration on a real-time basis.

A processor that is capable of embodying the improvements of our invention may be an integrated central processor that converts signals such as vehicle speed and engine throttle position, temperature and other driveline variables into control system output signals. The processor receives the sensed signals and operates on them in accordance with programmed control strategy. The processor includes appropriate gates and driver circuits for delivering the output that results from the operation of the strategy to the control system elements.

The processor has a central processor unit (CPU), a memory (ROM) in which program strategy is stored, a control unit that includes a read/write memory or random access memory (RAM) and internal buses between the memory and the central processor arithmetic logic unit.

The processor executes programs that are obtained from the memory and provides an appropriate control signal as the input signal conditioning portion of the processor reads the input data. The computation logic portions deliver the results of the computation to the output driver circuit under program control. The results of the computation carried out on the input data is stored in RAM where it can be addressed, fetched, erased, rewritten or changed depending upon the operating conditions.

The CPU portions that perform the computations comprise an integrated circuit distinct from the microprocessor chip that comprises the memory portions. The memory and the CPU computation portions are connected by internal bus and interface circuitry.

Data may be read from a first memory location as the processor seeks an instruction from memory. The fetched data then is fed to a data register or storage area and then to an instruction decoder. When an instruction is carried out, the data that is fetched is transferred to an arithmetic logic unit. Then sequentially, pursuant to instructions in the instruction decoder, other data may be fetched from memory and fed into the data registers. Also sequentially, the data in an accumulator may be transferred to the data register and then fed back into the memory and stored in the next memory location within the random access memory where it may be addressed during the next background loop.

Rotational speed may be sensed by using a multi-tooth wheel and a reluctance sensor to produce a square wave pulse voltage signal train. The frequency of the signal train is proportional to the rotational speed. Elapsed time between pulses is measured using a combined digital up counter and digital down counter and a multiple register stack that stores time measurements. Once a coherent is set of counts and time measurements have been made, the results are read by the CPU of the microprocessor. The CPU, using appropriate software, may compute the derivatives of the measured rotational velocity when the control equations stored in ROM require the use of derivatives as in the powertrain examples previously described. Velocity is computed by taking the reciprocal of each time measurement. The derivative terms for the velocity measurements can be computed using simple algebraic functions that are equivalent to a first velocity derivative as well as to higher derivatives of velocity.

BRIEF DESCRIPTION OF THE FIGURES OF THE DRAWINGS

FIG. 2 is a diagram of a typical sensor pulse input for the hardware illustrated in FIG. 1.

FIGS. 3a–3d show a schematic representation of stacked registers that receive time measurements indicated in FIG. 2 during successive background loops of the microprocessor as real-time readings are captured and stored, one by one, in stacked relationship before the registers are addressed during execution of control system functions in ROM portions of memory.

FIG. 4 is a diagram of a typical sensor pulse input when the tooth count for the toothed speed sensor wheel is greater than one (e.g., 3).

FIGS. 5a–5d show a schematic representation of stacked registers, as in the case of FIG. 3, where the toothed speed sensor wheel has three teeth.

FIG. 6 is a diagram of the clock tick values that are stored in temporary storage registers during the stored time interval for the sensed signal pulse of the speed sensor of FIG. 1.

PARTICULAR DESCRIPTION OF THE INVENTION

Figure 1:
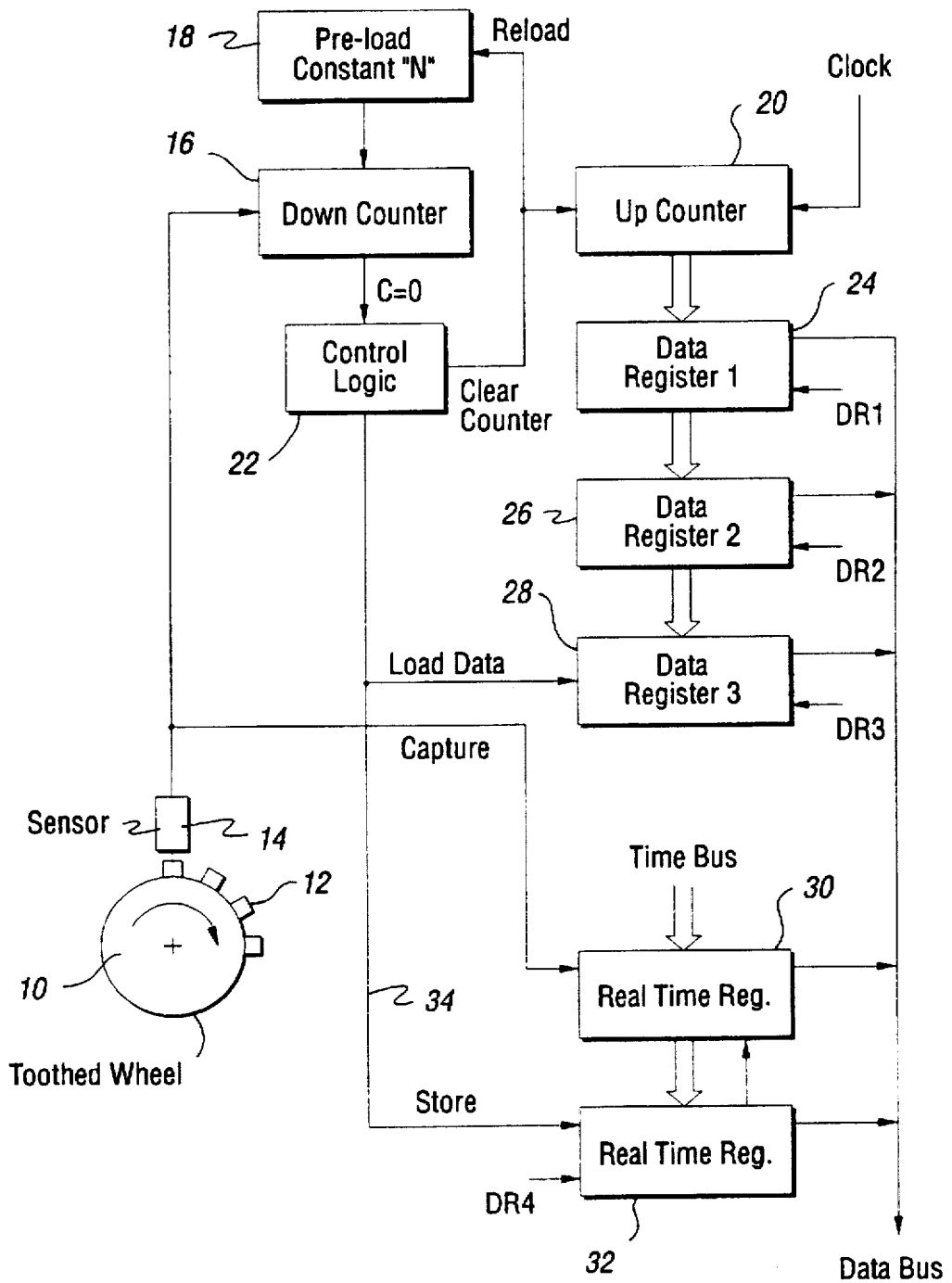
FIG. 1 is a block diagram of the hardware that is used in obtaining a useful speed signal, as well as derivatives of the value represented by that speed signal.

The control hardware is illustrated in block diagram form in FIG. 1. A toothed wheel 10 contains teeth 12 that pass in proximity to a Hall effect sensor 14 or other suitable magnetic pickup. The toothed wheel, in the case of an internal combustion engine, can be connected to or driven by the cam shaft of the engine. Wheel pulses are established by the sensor and are fed to a down counter 16. The counter is preset with a known count value, as indicated by the action block 18. An up counter shown at 20 is adapted to receive microprocessor clock ticks from the clock, as shown in FIG. 1. Simultaneously with a count-down to zero by counter 16, the up counter is reset to zero and is allowed to count up at the input clock rate. The up counter clock may pulse at a frequency of 1 MHz.

The down counter decrements from the preset value down to zero. After the preset number of pulses is down counted and the counter value reaches zero, the up counter is halted and cleared. This is achieved by control logic 22 which monitors the down counter and which is triggered to send a halt signal to the up counter 20 when the down counter count C=0, as indicated in FIG. 1. This clears the down counter 16 and the register location 18 is reloaded again with a constant count value.

The logic 22, when it receives the indication of a count of zero, will clear the up counter 20 following the transfer of the clock tick count from the counter 20 to a first data register 24. This is the first register of a register stack. In the example indicated in FIG. 1, there are three registers in the stack identified as data register 1, data register 2 and data register 3. We contemplate, however, that other numbers of data registers may be used if that is desired in any particular control application.

After the down counter is reloaded with a constant speed value, the sequence is repeated. After the second countdown of the down counter, the control logic 22 transfers count data from data register 24 to data register 26 and count data in register 26 is transferred to data register 28. New count data is stored in register 24. Then the logic clears up counter 20 and reloads down counter 16.

The data that is transferred at action block 24 and then shifted to action block 26 is a value equal to the clock ticks that are counted at 20 prior to the clearing of the up counter by the control logic at 22.

After the third countdown of the down counter, the contents of the stack are again shifted. The count data in data register 24 is transferred to data register 26 and the count data in register 26 is transferred to data register 28. New count data is stored in data register 24. The logic again clears up counter 20 and reloads down counter 16. Subsequent clearance of the up counter by the control logic will cause the contents stored in data register 3 to be dropped from memory.

A fourth register, which is a real time buffer register, is shown at 30. This register captures the real time of each tooth event or pulse from sensor 14. Register 32 captures the real time of each decrement to zero for the down counter. Each time event for the down count of the down counter results in the transfer of the real time ($T_n$, where Tn=real time and n=number of teeth) stored in real time buffer register 30 to real time register 32. This transfer is triggered by control logic 22. The function flow path from logic 22 is shown schematically at 34.

On subsequent time measurements, the oldest measurement is dropped off the stack and the contents are shifted down by one as the most recent value is placed on top at register 24 and at register 30. The CPU of the microprocessor then addresses the registers and reads all three values simultaneously during each background control loop.

FIG. 4 shows the shape of the sensor pulse input when there are three teeth on the tooth wheel. The value $\Delta t_1$ is the time elapsed between three pulses. The real time that elapses between the first and fourth pulses is indicated as $T_1$. The real time that elapses between the fourth pulse and the completion of the next pulse, indicated as $T_2$, is stored in capture channel register CC4 which corresponds to real time register 30 in FIG. 1. The corresponding readings for the subsequent pulses in real time are indicated by the symbols $T_3$ and $T_4$ in FIGS. 4, 5c and 5d. In a subsequent background loop, real time values are read sequentially and stored in capture channel registers CC4 and CC5. The control logic 22 triggers the transfer of the previously loaded real-time value in CC4 to capture channel register CC5. This is repeated for each of the countdowns of the counter 16.

FIG. 2 shows the sensor pulse input signal train and the register stack when the down counter is pre-set to 1(n=1), counting every tooth. In the case of FIGS. 2 and 3, the values that are stored in the capture channels are values that correspond to time measurements between single teeth rather than three pulses, as in the case of the timer indicated in FIGS. 4 and 5a–5d, which has a tooth count of 3.

FIG. 6 is an illustration of the clock tick values that are stored in registers 24, 26 and 28. If it is assumed that the down counter is pre-loaded with a value of 5, data register 1 will contain the number of clock ticks that are recorded by the up counter 20 during the interval associated with 5 counts of the down counter before the up counter 20 is cleared by the control logic 22. The corresponding clock tick values for registers 26 and 28 also are indicated. If the speed is not constant, the clock tick pulses at 24, 26 and 28 will have different counts.

The speed represented by the values in register 28 equals the reciprocal of the time $t_1$. The speed indicated by the data in register 26 is the reciprocal of the value $t_2$. Similarly, the speed represented by the data in register 24 is equal to the reciprocal of the value $t_3$.

In a classical control equation, the second derivative of velocity, the first derivative of velocity and the velocity itself are used in a functional representation of speed. Such a control equation is indicated as follows:

$$\frac{d^2V}{dt^2} + K_1 \frac{dV}{dt} + K_2 V = f(V)$$

The solution of this equation requires a measurement of velocity, acceleration and rate of change of acceleration on a real-time basis. This acceleration and the change of acceleration can be measured by using the data appearing in the stacked registers by dividing the clock tick values in those registers by the respective real time units for those registers as follows:

$$\text{Acceleration value } a_1 = \frac{\Delta \text{speed}}{\Delta \text{time}} = \frac{S_2 - S_1}{\Delta t_{2-1}}$$

$$\text{Acceleration value } a_2 = \frac{\Delta \text{speed}}{\Delta \text{time}} = \frac{S_3 - S_2}{\Delta t_{3-2}}$$

The second derivative $d^2a/dt$ can be represented by the value $a_2-a_1$. These computations involve simplified algebraic expressions that are much simpler than the computations that would be required using conventional procedures.

Attempts have been made in prior art systems to measure velocity by counting the pulses of the pulse generator within a prescribed time. Examples of these are found in U.S. Pat. Nos. 4,794,551 and 3,757,167. In each of these prior art systems, a presettable down counter is counted down and the central processor unit reads the countdown value in response to a prescribed number of clock pulses. The number of counts in the countdown process per unit of time then will determine velocity. There is no stacking of the readings that are obtained in stacked registers, however, and thus it is impossible in such an arrangement to compute the first derivative or any higher derivatives of the velocity using simple algebraic equations.

Having described a preferred embodiment of our invention, what we claim and desire to secure by U.S. Letters Patent is:

1. A digital microprocessor for use in a control system that requires a variable that depends upon rotational speed of a rotary member and derivatives of that speed, said microprocessor comprising;

means for sensing rotational speed of said rotary member and creating electrical pulses having a frequency directly related to said rotational speed;

a first digital counter, means for pre-loading said first counter with a predetermined count value, means for transferring said electrical pulses to said first counter whereby said pulses are counted;

a second digital counter and an electronic timing clock adapted to record processor operating time in clock ticks;

control logic adapted during each background control loop of said microprocessor to record each instant said first counter counts said predetermined count value and to simultaneously clear said second counter and record the elapsed time for counting to said predetermined count value;

a stack of temporary data storage registers, means for transferring to a first of said storage registers the recorded number of said clock ticks as said second counter is cleared;

said stack of storage registers being adapted to shift clock tick counts from said first storage register to a second storage register and from said second storage register to a third storage register as clock ticks are stored in sequence in said first storage register during each background control loop;

means for addressing said storage registers during an elapsed measuring time to obtain clock tick values; and means for computing rotational velocity and derivatives of said rotational velocity using said clock tick values in said storage registers and said elapsed time;

said first counter being a down counter adapted to count down from a pre-loaded constant count value to zero, said second counter being an up counter adapted to count the number of clock ticks following a clearing of said second counter by said control logic during each background control loop, the rotational velocity being determined using the equations:

$$V_1 = \frac{1}{\Delta t_1}, \ V_2 = \frac{1}{\Delta t_2} \text{ and } V_3 = \frac{1}{\Delta t_3}$$

where $V_1$, $V_2$ and $V_3$, respectively, are the recorded clock ticks in real time intervals $\Delta t_1$, $\Delta t_2$, and $\Delta t_3$ in said first, second and third storage registers.

2. A digital microprocessor for use in a control system that requires a variable that depends upon rotational speed of a rotary member and derivatives of that speed, said microprocessor comprising;

means for sensing rotational speed of said rotary member and creating electrical pulses having a frequency directly related to said rotational speed;

a first digital counter, means for pre-loading said first counter with a predetermined count value, means for transferring said electrical pulses to said first counter whereby said pulses are counted;

a second digital counter and an electronic timing clock adapted to record processor operating time in clock ticks;

control logic adapted during each background control loop of said microprocessor to record each instant said first counter counts said predetermined count value and to simultaneously clear said second counter and record the elapsed time for counting to said predetermined count value;

a stack of temporary data storage registers, means for transferring to a first of said storage registers the recorded number of said clock ticks as said second counter is cleared;

said stack of storage registers being adapted to shift clock tick counts from said first storage register to a second storage register and from said second storage register to a third storage register as clock ticks are stored in sequence in said first storage register during each background control loop;

means for addressing said storage registers during an elapsed measuring time to obtain clock tick values;

means for computing rotational velocity and derivatives of said rotational velocity using said clock tick values in said storage registers and said elapsed time;

first and second real time storage registers, means for capturing in a first of said real time storage registers the number of said clock ticks during each of said measuring times, said control logic being adapted to trigger a transfer of real time data from said first real time storage register to said second real time storage register when said first counter reaches a count equal to said pre-loaded count value, the rotational velocity being determined using the equations:

$$V_1 = \frac{1}{\Delta t_1}, V_2 = \frac{1}{\Delta t_2} \text{ and } V_3 = \frac{1}{\Delta t_3}$$

where $V_1$, $V_2$ and $V_3$, respectively, are the recorded clock ticks in real time intervals $\Delta t_1$, $\Delta t_2$ and $\Delta t_3$ in said first, second and third storage registers.

3. A digital microprocessor for use in a control system that requires a variable that depends upon rotational speed of a rotary member and derivatives of that speed, said microprocessor comprising;

means for sensing rotational speed of said rotary member and creating electrical pulses having a frequency directly related to said rotational speed;

a first digital counter, means for pre-loading said first counter with a predetermined count value, means for transferring said electrical pulses to said first counter whereby said pulses are counted;

a second digital counter and an electronic timing clock adapted to record processor operating time in clock ticks;

control logic adapted during each background control loop of said microprocessor to record each instant said first counter counts said predetermined count value and to simultaneously clear said second counter and record the elapsed time for counting to said predetermined count value;

a stack of temporary data storage registers, means for transferring to a first of said storage registers the recorded number of said clock ticks as said second counter is cleared;

said stack of storage registers being adapted to shift clock tick counts from said first storage register to a second storage register and from said second storage register to a third storage register as clock ticks are stored in sequence in said first storage register during each background control loop;

means for addressing said storage registers during an elapsed measuring time to obtain clock tick values;

means for computing rotational velocity and derivatives of said rotational velocity using said clock tick values in said storage registers and said elapsed time;

first and second real time storage registers, means for capturing in a first of said real time storage registers the number of clock ticks during each of said measuring times, said control logic being adapted to trigger a transfer of real time data from said first real time storage register to said second real time storage register when said first counter reaches a count equal to said pre-loaded count value, the rotational velocity being determined using the equations:

$$V_1 = \frac{1}{\Delta t_1}, V_2 = \frac{1}{\Delta t_2} \text{ and } V_3 = \frac{1}{\Delta t_3}$$

where $V_1$, $V_2$ and $V_3$, respectively, are the recorded clock ticks in real time interval $\Delta t_1$, $\Delta t_2$ and $\Delta t_3$ in said first, second and third storage registers, derivatives of said rotational velocity being determined using the equations:

$$\frac{dV_1}{dt} = a_1 \text{ (acceleration)} = V_2 - V_1$$

$$\frac{dV_2}{dt} = a_2 \text{ (acceleration)} = V_3 - V_2,$$

$$\text{and } \frac{d^2V}{dt} = \frac{da}{dt} = a_2 - a_1.$$

\* \* \* \* \*